J. W. POWER.
CLEAN OUT FITTING FOR PIPES.
APPLICATION FILED JULY 23, 1914.
1,149,465.
Patented Aug. 10, 1915.
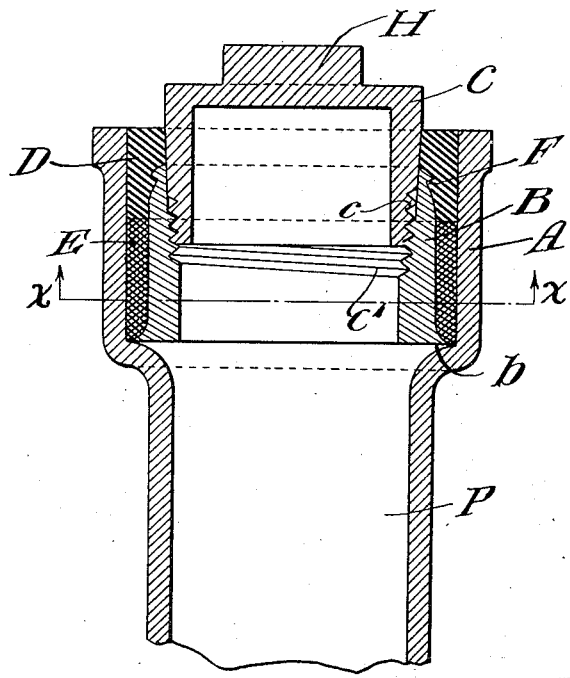
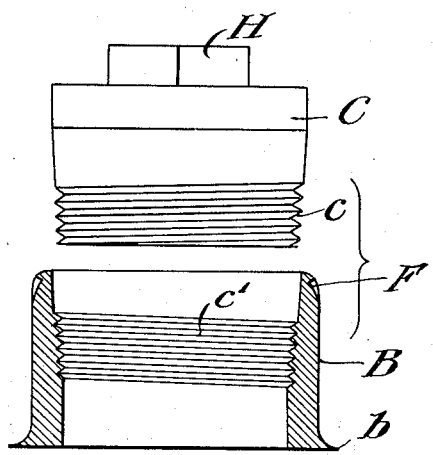
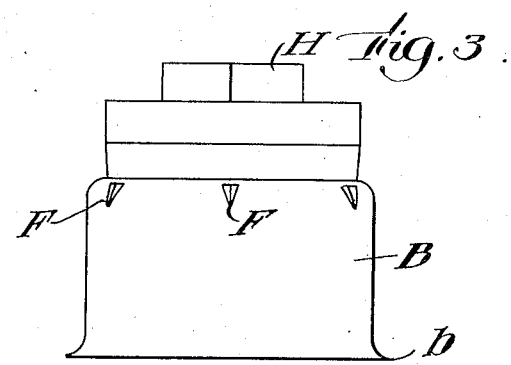
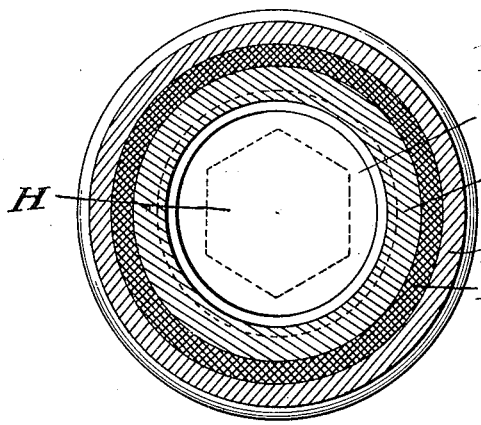
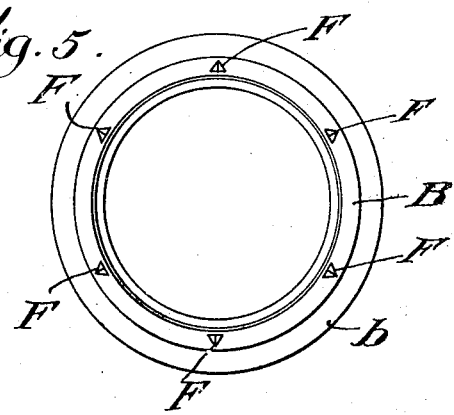
Witnesses:
Josephine H. Ryan
Charles D. Woodbury
Inventor:
John W. Power,
by Roberts, Roberts & Cushman
Attorneys

UNITED STATES PATENT OFFICE.

JOHN W. POWER, OF PEABODY, MASSACHUSETTS.

CLEAN-OUT FITTING FOR PIPES.

1,149,465.                Specification of Letters Patent.    Patented Aug. 10, 1915.

Application filed July 23, 1914.   Serial No. 852,704.

*To all whom it may concern:*

Be it known that I, JOHN W. POWER, a citizen of the United States, and resident of Peabody, in the county of Essex and State of Massachusetts, have invented new and useful Improvements in Clean-Out Fittings for Pipes, of which the following is a specification.

This invention relates to a clean-out plug and sleeve for the dead-end of a pipe, and its object is to provide a novel and simple clean-out fitting for soil pipes, which shall be more secure against the escape of gas, and more convenient to operate than fittings of similar character heretofore used.

In the accompanying drawings which illustrate one embodiment of the invention, Figure 1 is a longitudinal central section through the end of a pipe with the sleeve and plug in position; Fig. 2 is a side elevation of the plug, and horizontal section through the sleeve, said parts being shown unassembled; Fig. 3 is a side elevation of the plug and sleeve assembled; Fig. 4 is a section through the line $x$—$x$ of Fig. 1; and Fig. 5 is a plan view of the sleeve.

Referring to the drawings, P represents a soil pipe having a hub or enlargement A at its end. Within the hub A is a sleeve B terminating short of the outer end of the hub, and abutting against the shoulder between the hub A and the pipe proper. The sleeve B is preferably flanged or flared at its inner end, as shown at $b$, so as to firmly engage the shoulder at the base of the hub and leave a substantial space between the hub and the body of the sleeve to receive the packing and sealing materials hereinafter mentioned.

The sleeve B is interiorly threaded, as shown at $c'$, and receives the clean-out plug C which is exteriorly threaded as shown at $c$. Plug C is provided with a nut H by which the plug may be screwed in or out of the sleeve. The exterior walls of the plug C, occupied by the threads $c$, are preferably tapered, as shown in the drawings, toward the inner end of the plug, and the walls of the sleeve, occupied by the thread $c'$, are correspondingly tapered from the outer end of the sleeve inward.

Between the inner end of the sleeve B and the hub A is a packing E of oakum or other suitable packing material tightly forced into the space between the sleeve and the hub. At the outer end of the sleeve B is a seal of lead or other soft metal occupying the space between the outer end of the sleeve B and the hub A, and also between the plug C and the hub A. The sealing material D is preferably poured into the recess while in molten condition and then hammered or otherwise packed down to form a tight seal directly between the plug and the hub, and also between the sleeve and the hub. Heretofore it has been the practice to use a sleeve corresponding to the sleeve B, which projects beyond the end of the hub A, whereby the seal is formed exclusively between the sleeve and the hub leaving the plug C unsealed excepting in so far as it is sealed by the screw thread connection with the sleeve. Any looseness or imperfection in the screw threads, therefore, permits the escape of gas from the soil pipe between the sleeve and plug, whereas in my construction the plug itself is directly sealed to the hub by the sealing material D and the escape of gas is therefore rendered impossible.

The tapered construction of the plug and sleeve makes it easy to remove the plug for the purpose of cleaning out the dead-end of the pipe by merely giving the plug a lateral blow which tends to loosen the screw connection and permits the plug readily to be withdrawn from its seat. Similarly, when the plug is again inserted the tapered construction makes it easy to place the plug again in closed position, and the tapered form of the walls of the plug immediately above the screw threads, acting in the manner of a wedge, again insures an effective closure with the seal D. If necessary or desirable the tightness of the seal may be further insured after the plug is again inserted into the pipe end, by hammering or tamping down the seal D about the plug.

In order to prevent the sleeve B from turning in the hub when the plug is unscrewed or screwed up, the exterior surface of the sleeve near its outer end is provided with means which coöperate with the sealing material D to prevent rotation of the sleeve, such means consisting as herein shown of the recesses or depressions F into which the material D flows, thus tightly locking the sleeve against turning. In place of the depressions, projections might be used, which could be embedded in the sealing material D, or other contrivances for preventing the rotation of the sleeve B by coöperation with the sealing material D.

I claim:—

In combination with a pipe having a hub at its end, a tubular sleeve within the hub terminating short of the outer end of the hub, a plug removably secured to the interior of the sleeve and projecting beyond the outer end thereof, and a body of packing material between the hub and the sleeve and between the hub and the plug, forming a single seal by which the sleeve and plug are both directly sealed to the hub, and by which the sleeve is permanently sealed to the hub while the plug may be removed from the sleeve without disturbing either the sleeve or the said body of packing material.

Signed by me at Boston, Massachusetts, this 20th day of July 1914.

JOHN W. POWER.

Witnesses:
CHARLES D. WOODBERRY,
FLORENCE A. COLLINS.